(12) United States Patent
Wright (10) Patent No.: US 11,187,350 B2
(45) Date of Patent: Nov. 30, 2021

(54) SUBSEA FLANGE TOOL (71) Applicant: David C. Wright, Spring, TX (US)

(72) Inventor: David C. Wright, Spring, TX (US)

( * ) Notice: Subject to any disclaimer, the term of this patent is extended or adjusted under 35 U.S.C. 154(b) by 279 days.

(21) Appl. No.: 16/461,341

(22) PCT Filed: Nov. 15, 2017

(86) PCT No.: PCT/US2017/061818
§ 371 (c)(1),
(2) Date: May 15, 2019

(87) PCT Pub. No.: WO2018/093914
PCT Pub. Date: May 24, 2018

(65) Prior Publication Data
US 2019/0301641 A1 Oct. 3, 2019

Related U.S. Application Data (60) Provisional application No. 62/422,455, filed on Nov. 15, 2016.

(51) Int. Cl.
*F16L 1/26* (2006.01)
*B23P 19/06* (2006.01)
(Continued)

(52) U.S. Cl.
CPC .............. *F16L 1/26* (2013.01); *B23P 19/06* (2013.01); *B23P 19/061* (2013.01);
(Continued)

(58) Field of Classification Search
CPC ....... B23P 19/06; B23P 19/061; B23P 19/069; F16L 19/02; F16L 19/0206;
(Continued)

(56) References Cited

U.S. PATENT DOCUMENTS 2,701,491 A   2/1955 Ross
3,166,123 A * 1/1965 Watkins ................ E21B 33/035
                                                166/349

(Continued)

FOREIGN PATENT DOCUMENTS

WO   WO-2017168176 A1 * 10/2017 ............ F16L 23/003

*Primary Examiner* — Jason L Vaughan
(74) *Attorney, Agent, or Firm* — Matthews, Lawson, McCutcheon & Joseph, PLLC (57) ABSTRACT A torquing tool for rotating bolts connecting a pipe flange in a subsea environment, comprising a first guide for guiding movement of the torquing along a pipe, a socket for engaging a first bolt, a shaft for transferring torque from a motor to the socket, and a first protruding member for insertion between the pipe and a second bolt of the pipe flange, to prevent the torquing tool from rotating due to counter torque created while applying torque to the first fastener. The torquing tool can further comprise a second protruding member adjacent the socket, wherein the second protruding member can be inserted between the pipe and a third bolt of the pipe flange. The torquing tool can further comprise an angled shaft for transferring torque from the motor to the socket, wherein an axis of rotation of the motor is different from an axis of rotation of the socket.

20 Claims, 10 Drawing Sheets (51) Int. Cl.
*F16L 19/02* (2006.01)
*F16L 49/04* (2006.01)

(52) U.S. Cl.
CPC ......... *B23P 19/069* (2013.01); *F16L 19/0206* (2013.01); *F16L 49/04* (2013.01)

(58) Field of Classification Search
CPC ..... F16L 19/0231; F16L 19/025; F16L 23/02; F16L 23/036; F16L 49/04; F16L 1/26
See application file for complete search history.

(56) References Cited

U.S. PATENT DOCUMENTS

| | | | |
|---|---|---|---|
| 3,399,584 A | 9/1968 | Lewicki | |
| 3,603,617 A * | 9/1971 | Lochridge | F16L 23/003 285/24 |
| 3,620,554 A * | 11/1971 | Ward | F16L 23/003 285/18 |
| 3,724,061 A * | 4/1973 | Schipper | B63B 35/03 29/464 |
| 3,730,537 A * | 5/1973 | Ward | F16L 23/003 277/314 |
| 3,934,428 A | 1/1976 | Hedin | |
| 4,039,087 A * | 8/1977 | Sandvick, Sr. | F16L 1/09 29/237 |
| 4,674,915 A * | 6/1987 | Shatto, Jr. | B25J 5/00 114/250 |
| 4,832,530 A * | 5/1989 | Andersen | F16L 1/26 285/39 |
| 5,004,017 A * | 4/1991 | White | F16L 1/26 138/106 |
| 5,146,814 A | 9/1992 | Vasichek | |
| 5,425,599 A * | 6/1995 | Hall | F16L 1/26 405/158 |
| 5,437,517 A * | 8/1995 | Carrioli | F16L 55/1608 405/169 |
| 6,260,252 B1 * | 7/2001 | Wijsman | B23P 19/06 29/426.1 |
| 6,439,807 B1 | 8/2002 | Wijsman | |
| 6,742,963 B2 | 6/2004 | Bekkevold et al. | |
| 7,445,404 B2 * | 11/2008 | Giles | B23P 19/069 405/169 |
| 8,141,909 B2 * | 3/2012 | Clover | F16L 1/26 285/124.3 |
| 9,506,586 B2 * | 11/2016 | Van Heerden | F16L 1/26 |
| 10,174,867 B2 * | 1/2019 | Cavallini | F16L 23/003 |
| 10,926,365 B2 * | 2/2021 | Wen | B23P 19/10 |
| 2002/0096020 A1 | 7/2002 | Hart et al. | |
| 2009/0058076 A1 | 3/2009 | Giles et al. | |
| 2013/0136542 A1 * | 5/2013 | Buchan | F16L 1/26 405/184.1 |
| 2016/0039076 A1 * | 2/2016 | Voss | F16L 23/003 29/468 |

\* cited by examiner

SUBSEA FLANGE TOOL

REFERENCE TO RELATED APPLICATIONS

The present application is a US national stage application claiming priority to Patent Cooperation Treaty (PCT) application No. PCT/US17/61818, filed 15 Nov. 2017, that in turn claims priority to and benefit of U.S. Provisional Application No. 62/422,455, filed 15 Nov. 2016, and entitled "Subsea Flange Tool." The content of the above-referenced Patent Cooperation Treaty (PCT) application No. PCT/US17/61818 is incorporated herein by reference.

FIELD

Embodiments usable within the scope of the present disclosure relate, generally, to subsea tools and, more particularly, to a subsea flange tool and method for loosening and tightening flange fasteners in a subsea environment.

BACKGROUND

Subsea hydrocarbon exploration and production has increased as technology has allowed more efficient methods and tools to access these deposits. Flange connections are often utilized in subsea installations to secure pipes together in a manner that provides for pressure control. Flange connections require use of numerous fasteners, typically threaded bolt and nut assemblies, configured in a circular orientation. In some cases, the tightening/loosing of the fasteners can only be accomplished remotely utilizing remotely controlled vehicles commonly referred to as ROVs. Pipeline connections may also require maintenance and replacement over the course of time as operations change and various pipeline configurations are reworked. The available equipment and subsea environment creates a challenging condition to work in when performing the maintenance and work-over activities described above.

Prior art tools operated by ROVs to tighten fasteners typically utilize a rotating socket with a non-rotating ring around the rotating socket. The tool is moved generally perpendicular to the pipe axis to fit over the fastener. The non-rotating ring is often times too thick to fit between the fasteners and the wall of the pipe. Often times, such tools are difficult to operate by an ROV as they do not provide any guide means to assist in the connection process with the fastener. This may result in a long disconnection process as multiple attempts may be required to connect the wrench tool with the fastener. Sometimes, a diver may be required to perform the pipe disconnection procedure as the ROVs may be too difficult and inefficient to use.

One example of such a tool is disclosed in U.S. Pat. No. 3,668,949, issued Jun. 13, 1972, to Walker. The patent discloses an apparatus for making an underwater pipe connection including one or more power wrench means adapted to be universally or multi-directionally positioned for connecting, exemplarily, a pipeline to a wellhead. The apparatus includes a pair of such wrench means for transporting and positioning a spacer pipe between a wellhead and the end of a pipe or fluid flow line spaced therefrom and co-operable with rotatable coupling means carried on opposite ends of such a spacer pipe and co-operable with a fixed connector fitting on such a wellhead and on the end of the pipe flow line. Specifically, a power wrench for use with a connector means including a rotatable externally gear toothed collar such as may be used in the oil drilling industry for connecting or coupling a pipe to a connector fitting wellhead. The power wrench has a movable pivotal jaw-like member co-operable with a rotatably mounted worm gear for holding and positioning the worm gear in driving engagement with the collar.

Accordingly, it would be desirable to provide a subsea flange tool that provides improved guide means for aligning a socket, a ring, or other rotating members with the fastener for more efficient operability in subsea and deep water environments. Consequently, there remains a need for an improved subsea flange tool. Those skilled in the art have long sought and will appreciate the present invention which addresses these and other problems.

The following patents and patent applications represent additional background art to the instant disclosure but are believed to not address or provide adequate solutions to the problems encountered with subsea flange fasteners.

U.S. Pat. No. 4,832,530, issued May 23, 1989, to Andersen, et al., discloses an apparatus for laying large pipe sections underwater without on-site manual participation. A beam is releasably attached to a pipe section that is to be lowered to the floor of the water body and attached to the open end of the previously laid pipe section. A positioning fork depending from the beam is settled onto the prior pipe section with the fork legs straddling the pipe and assuring alignment of the pipe ends. Positioning rams in cooperation with landing gears on the fork legs achieve concentric abutment of the end flanges. The flange on the new pipe section is rotatable and a positioner from the beam is releasably attached to the rotatable flange and rotated thereby to align bolt holes through the flanges. A wrench carried on a rigging releasably attached to the new pipe section behind the flange is movable between the bolt holes and pushes bolts partially pre-inserted in the bolt holes through the flanges and into engagement with nuts pre-positioned behind the bolt holes of the fixed flange. Surveillance cameras enable an operator to view the operations and upon completion, the beam, flange positioner and rigging are released from the pipe and raised to the water's surface.

U.S. Pat. No. 6,234,717, issued May 22, 2001, to Corbetta, discloses a method and apparatus for connecting underwater conduits and more specifically, to a method and apparatus which is capable of performing the diverless connection of underwater flowlines and connection of these flowlines to underwater structures such as flowline bases, xmas trees and templates. The connection of underwater conduits facilitated by the use of a remotely operated vehicle and connection apparatus both being launchable and recoverable by a support vessel. The connection apparatus adapted to mount on at least one of the underwater conduits and the connection apparatus allowing for docking of the remotely controlled vehicle which then captures and draws a second conduit to form a continuous flowline.

U.S. Pat. No. 6,439,807, issued Aug. 27, 2002, to Wijsman, discloses a method and apparatus for connecting two pieces of pipe having flanges when the pipe pieces are located deep under a water surface. A movable bolt wrench is provided which has a number of wrenches mounted in a frame corresponding to the bolt holes on the flanges of the pipe pieces. Bolts located in the bolt wrenches are aligned with the bolt holes of the flanges and inserted into the bolt holes. A nut wrench is also provided containing nuts which, when aligned, are threaded onto the ends of the bolts associated with the bolt wrench. After the bolt and nut connections are made, these bolts and nuts are tightened by the operation of the bolt and nut wrenches.

U.S. Pat. No. 7,445,404, issued Nov. 4, 2008, to Giles, et al., discloses a remote bolted flange connection apparatus and methods of operation thereof. A single-module deployable bolted flange connection apparatus makes up standard flange joints for various pipeline tie-in situations, such as spool piece connection and flowline-tree connections, without the use of divers and auxiliary multiple pieces of equipment. An outer frame, carries one or more claws for grabbing the pipe/spool to provide flange alignment. The claws are suspended and driven by a novel arrangement of five hydraulic rams. A crash-resistant inner frame houses complete connection tooling. The tooling performs the final alignment steps, inserts the gasket and studs, applies the required tension, and connects the nuts. Studs and nuts are stored separately from the tooling in an indexed carousel, to permit multiple operations, reverse operations (disconnection), and re-work of failed steps, all without external intervention.

U.S. Patent Application No. 2009/0277307, published Nov. 12, 2009 to Scofield, discloses a tool for loosening or tightening bolts on subsea structures. The tool grasps a portion of the structure and, using hydraulic wrenches, tightens or loosens bolts located on the structure. However, this tool is more targeted toward BOP structures and does not provide the maneuverability desired for multiple applications.

U.S. Patent Application No. 2012/0267116, published Oct. 25, 2012, to Anderson, discloses a tool for removing a first flange from a second flange comprises a housing having a central axis, a first end, and an open second end opposite the first end. The housing also includes a first access port extending radially therethrough. In addition, the tool comprises an annular basket grapple coaxially disposed within the second end of the housing and configured to coaxially receive and engage a first flange. The basket grapple has a first end, a second end opposite the first end, and a cutout extending radially therethrough. The outer surface of the basket grapple includes external threads that engage mating internal threads on the inner surface of the housing. Further, the tool comprises a key releasably coupled to the housing. The key is configured to selectively prevent relative rotation between the basket grapple and the housing.

U.S. Patent Application No. 2012/0273212, published Nov. 1, 2012, to Anderson, discloses a tool for separating a first flange from a second flange comprises an annular body disposed about a central axis and defining a flange capture cavity. In addition, the tool comprises a plurality of circumferentially-spaced wedge members moveably coupled to the body. Further, the tool comprises a first actuation assembly configured to move each wedge member from a first position radially withdrawn from the capture cavity to a second position radially advanced into the capture cavity.

Typical flange tools used to remotely tighten/loosen fasteners are complex and typically contain torquing systems embedded within the connector bodies and/or covered by framing. These torquing systems often require the interaction of many moving parts, such as gears, bearings, cam rings, wedge rings, dogs, springs, etc. and are susceptible to contamination and frequent failure, especially when used within a subsea environment. Performing maintenance on subsea flange tools or other tools used to connect or disconnect flange fasteners is difficult, requiring retrieval of entire equipment stacks to the surface. A need therefore exists for a flange tool that is not susceptible to contamination, is easy to maintain, and provide the ability to reliably and remotely make or break fastener connections for extended periods of time.

SUMMARY

The present application is directed to an inventive subsea flange tool capable of torquing bolts and other connectors in a subsea environment.

One embodiment of the present invention is directed to a subsea tool for applying torque to a fastener extending through a subsea pipe flange. The subsea tool comprises a frame, a first guide (and optionally a second guide) in connection with the frame, where the guide(s) align the movement of the subsea tool along a pipe, a motor mounted to the frame, a socket adapted for mating with a first fastener, and a shaft transferring torque from the motor to the socket. In various embodiments, the shaft may be flexible or angled, offsetting the axis of rotation of the motor from the axis of rotation of the socket, or may include an interchangeable torque multiplier in communication with the motor and capable of changing the tool's speed, torque, or combinations thereof. In an embodiment, the guide(s) may comprise rounded surfaces for receiving the pipe therein. In an embodiment, the tool may further comprise first and second adjustable protruding members for insertion between the pipe and second and third fasteners.

Another embodiment of the present invention is directed to a method of applying torque to a fastener of a flange connection in a subsea environment, comprising the steps of positioning a tool having at least one guide surface and a socket along a surface of the pipe, moving the torquing tool along the surface of the pipe, mating the socket with a first fastener of the flange connection, and actuating a motor to rotate the first fastener. In an embodiment, the method may further comprise inserting a first (and optionally a second) protruding member between a second (and optionally a third) fastener in the pipe to prevent rotation of the torquing tool rather than the fastener. In another embodiment, the torque may be transferred from the tool to the by means of a flexible shaft transferring the torque from a motor having a first axis of rotation and a socket having a second axis of rotation.

Still another embodiment of the present invention is directed to a torquing tool for connecting pipe flanges in a subsea environment, comprising a first guiding surface (and optionally a second guiding surface) for guiding movement of the torquing tool along a pipe, a socket configured to engage a first bolt, a shaft for transferring torque from a motor to the socket, and a first protruding member (and optionally a second protruding member) inserted between the pipe and a second bolt (optionally a third bolt) of the pipe flange, wherein the socket and the protruding member extend for an equal length along the torquing tool. In an embodiment, the shaft is angled to provide different axes of rotation for the motor and the socket. In an embodiment, the socket is interchangeable and magnetized for holding bolts of varying shapes, sizes, or combinations thereof.

The above general descriptions and the following detailed descriptions are merely illustrative of the generic invention, and additional modes, advantages, and particulars of this invention will be readily suggested to those skilled in the art without departing from the spirit and scope of the invention.

BRIEF DESCRIPTION OF THE DRAWINGS

The accompanying drawings, which are incorporated in and constitute a part of this specification, illustrate an implementation of apparatus consistent with one possible embodiment of the present invention and, together with the detailed description, serve to explain advantages and principles consistent with the disclosure. In the drawings.

DETAILED DESCRIPTION OF THE EMBODIMENTS

Before describing selected embodiments of the present disclosure in detail, it is to be understood that the present invention is not limited to the particular embodiments described herein. The disclosure and description herein is illustrative and explanatory of one or more presently preferred embodiments and variations thereof, and it will be appreciated by those skilled in the art that various changes in the design, organization, means of operation, structures and location, methodology, and use of mechanical equivalents may be made without departing from the spirit of the invention.

As well, it should be understood that the drawings are intended to illustrate and plainly disclose presently preferred embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

Moreover, it will be understood that various directions such as "upper", "lower", "bottom", "top", "left", "right", "first", "second" and so forth are made only with respect to explanation in conjunction with the drawings, and that components may be oriented differently, for instance, during transportation and manufacturing as well as operation. Because many varying and different embodiments may be made within the scope of the concept(s) herein taught, and because many modifications may be made in the embodiments described herein, it is to be understood that the details herein are to be interpreted as illustrative and non-limiting.

Figure 1:
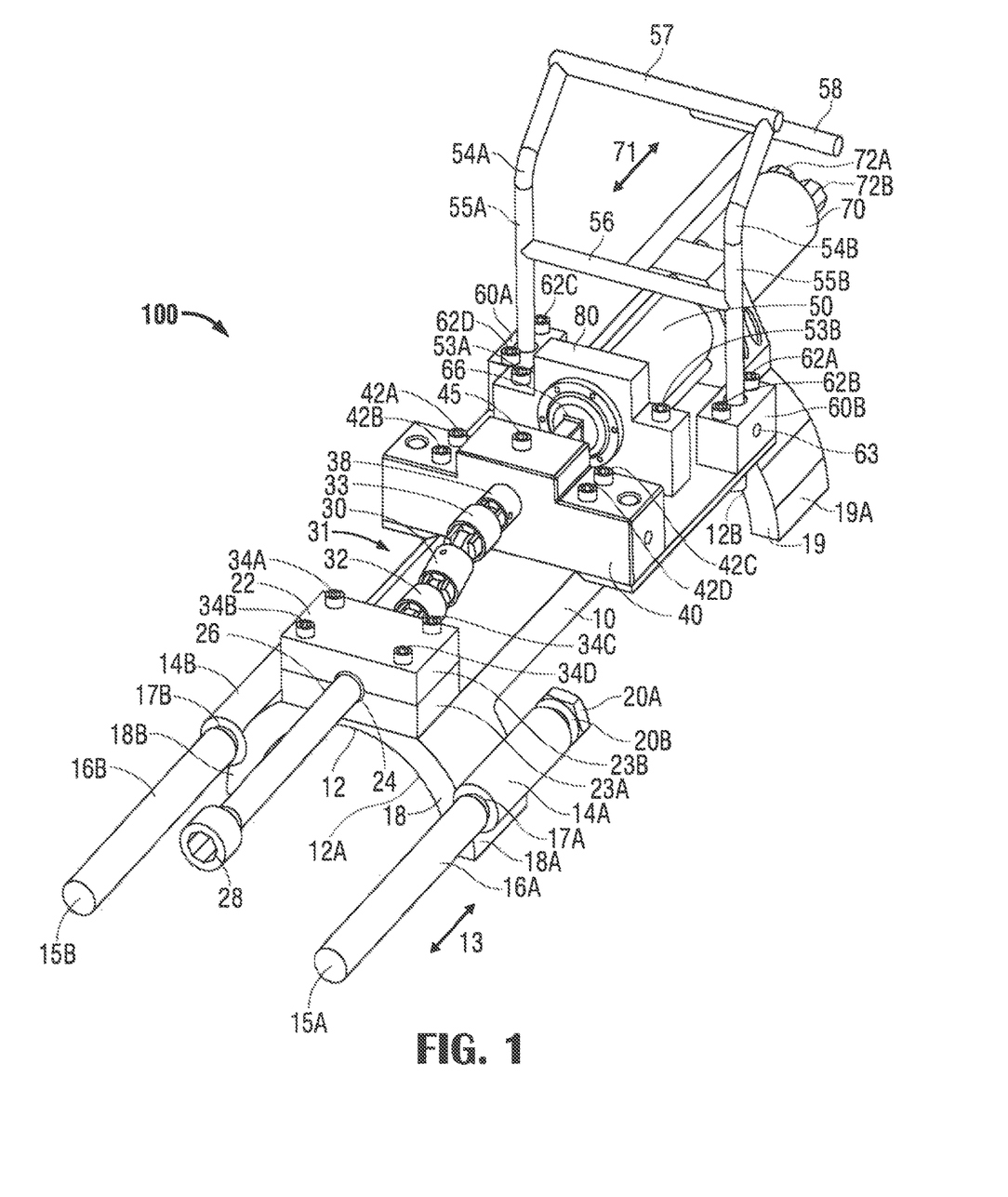
FIG. 1 depicts a perspective view of a subsea flange tool in accord with one possible embodiment of the present invention.
Figure 2:
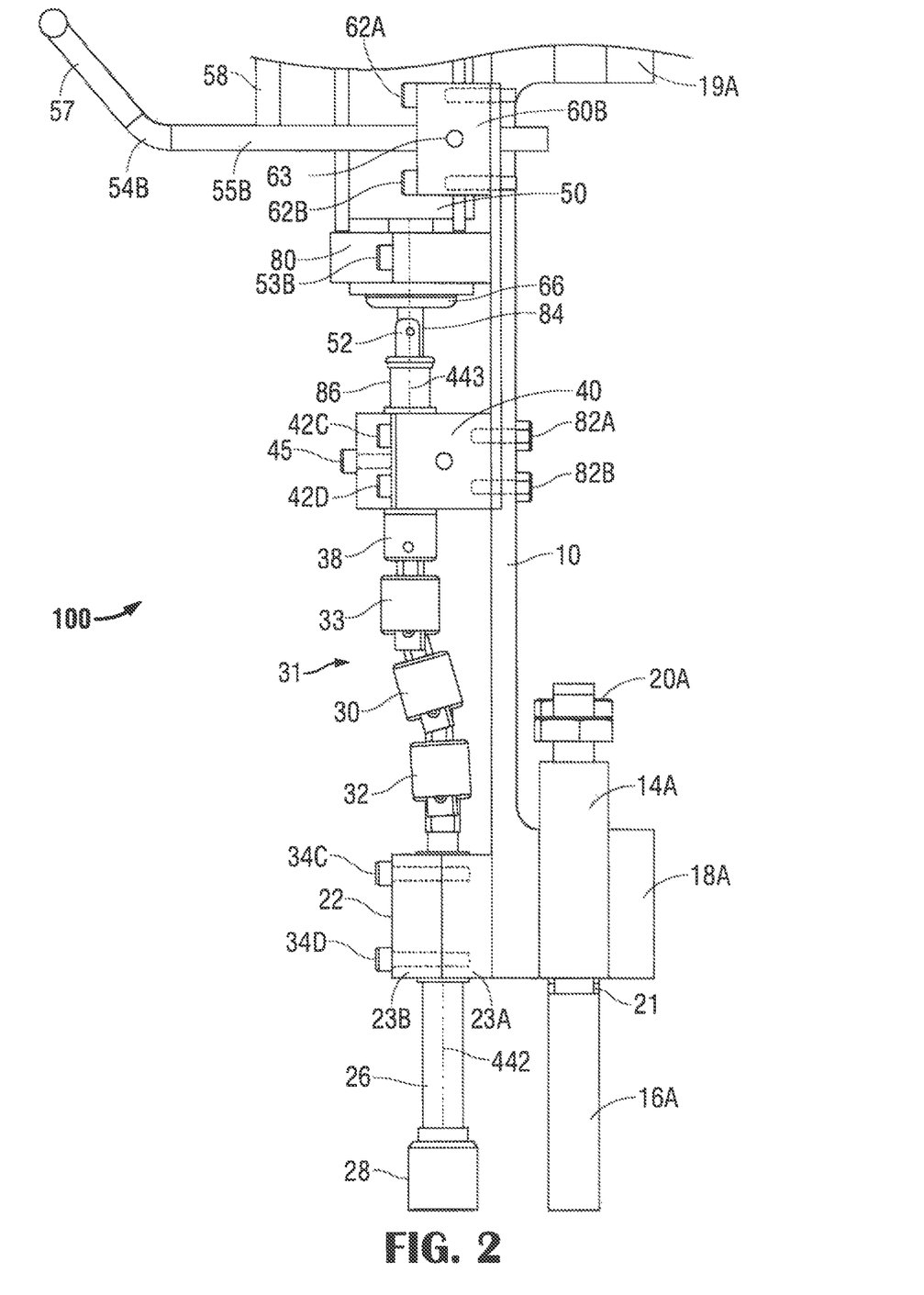
FIG. 2 depicts an elevational side view, partially in hidden lines, of a subsea flange tool in accord with one possible embodiment of the present invention.

The present disclosure is directed to an apparatus usable for removing and/or installing subsea fasteners, which threadably joint pipeline flanges. Turning now to FIG. 1 and FIG. 2, subsea flange tool (100) is depicted in accord with one possible embodiment of the present invention. Subsea flange tool (100) is supported on elongated frame body (10) and may comprise upper pipe guide (19) and lower pipe guide (18) that may be sized to conform or generally conform to outer surface of a pipe (312) (See FIG. 3 and FIG. 4), which will typically extend perpendicularly (as shown in the figures) from the flange connection, such as flange connection (310). Lower pipeline (313), or other structures such as a blowout preventer or the like, may extend from flange connection (310).

Upper and lower pipe guides (19, 18) may also be referred to herein as first and second pipe guides, as the pipeline or other structures can be oriented horizontally or diagonally in the subsea environment. In the depicted embodiment, pipe guides (18, 19) can comprise a semi-circular interior surface to provide an open region to receive the outer surface/outer wall of the pipe (312) and should be sized to be at least as, large as or larger in diameter, than the pipe (312).

Pipe guide (18) may comprise first leg (18A) and second leg (18B), which can be connected by a central frame (10). Likewise, upper pipe guide (19) may comprise leg (19A) and a corresponding other leg (19B, not shown). Curved or semi-circular lower pipe guide (18) interior surface (12A) and a corresponding rounded, curved, or semi-circular interior surface (12B) of the upper pipe guide (19) can be operable to engage the curved outside wall of pipe (312) to guide subsea flange tool (100) along the pipe (312) to engage the fasteners, which will typically be oriented generally parallel to the pipe (312). Rounded interior surfaces (12A, 12B) can be approximately the same or larger than the diameter of pipe (312) to receive the pipe (312) therein.

Figure 4:
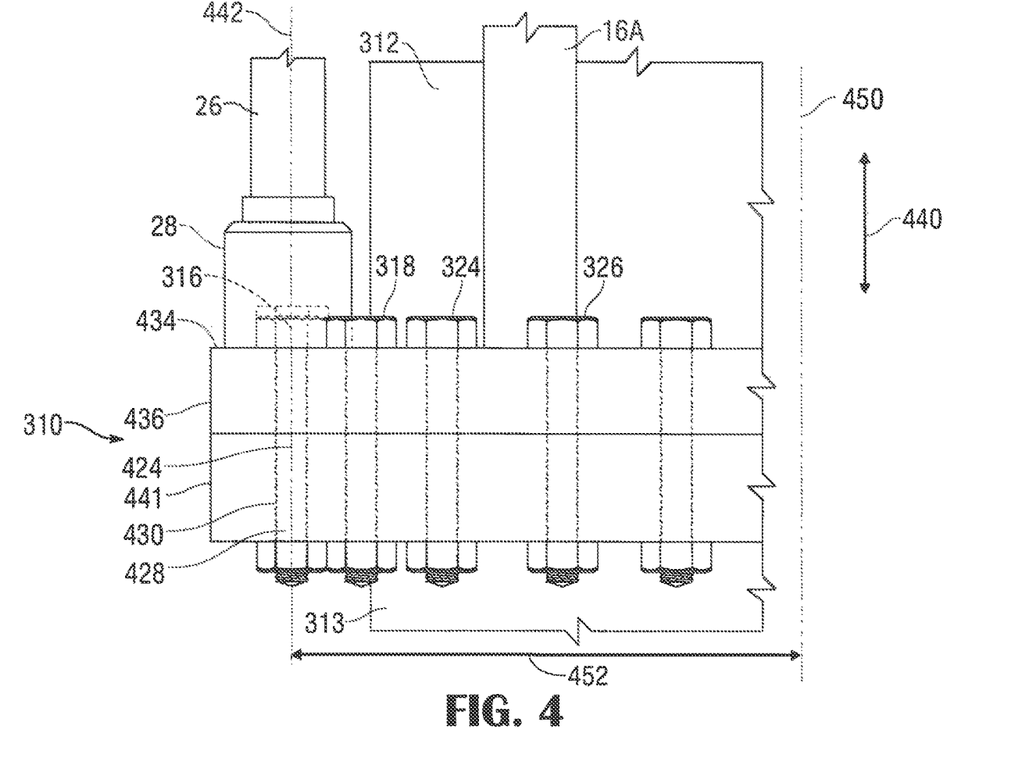
FIG. 4 depicts an enlarged elevational side view of a subsea flange tool engaged with a pipe flange, partially in hidden lines, in accord with one possible embodiment of the present invention.

However, the present disclosure is not limited to semi-circular pipe guides. Preferably, frame (10) provides guide surfaces to engage a wall of the pipe (312) to provide alignment of the subsea flange tool (100), enabling the subsea flange tool (100) to move along the pipe (312) as indicated by arrow (440, as shown in FIG. 4). Accordingly, the interior surfaces (12A, 12B) allow the longitudinal axis of bolts, studs, or the like, such as axis (424) of flange bolt (428), to align with the driver shaft axis (442), as shown in FIG. 4 and explained below. Accordingly, in the depicted embodiment of the present disclosure, the interior surfaces (12A, 12B) of pipe guides (18, 19) are semi-circular. However the pipe guides could have other shapes that sufficiently conform to a wall of the pipe (312), or contact the pipe (312) at several different points, to provide a guiding function along the pipe (312), such as rectangular, triangular, or the like.

Other types of guides and alignment members may be further utilized, as depicted in FIGS. 1 and 2. In the depicted embodiment, support member (14A) can be attached to lower leg (18A) to provide a mounting for first alignment member (16A), which is depicted as a first protruding member or a first shaft. First driver alignment member (16A) can be inserted into opening (17A), which may be cylindrical or otherwise conform to the shape and size of first driver alignment member (16A). The length or extension of first driver alignment member (16A), with respect to support member (14A), can be adjusted axially in the direction indicated by arrow (13) so that an end (15A) of the first driver alignment member (16A) is adjusted to a desired length with respect to a socket (28). The first alignment member (16A) may be secured at a desired position by various means such as, for example, lock nuts (20A, 20B). The flange tool (100) also comprises a second driver alignment member (16B), depicted as a second protruding member or a second shaft. The second driver alignment member (16B) can be inserted within a second support member (14B), which is in connection with the second lower leg (18B).

The distance that the driver alignment members (16A, 16B) extend from the support members (14A, 14B) can be accomplished by removing the long driver alignment members (16A, 16B) depicted in FIG. 1 and replacing them with longer driver alignment members (not shown) or shorter driver alignment members (16A, 16B), shown in FIG. 2. Retaining nuts (20A, 20B) and similar nuts (not shown) adjacent to driver alignment member (16B) can be used to lock the driver alignment members (16A, 16B) within the corresponding support members (14A, 14B).

Figure 3:
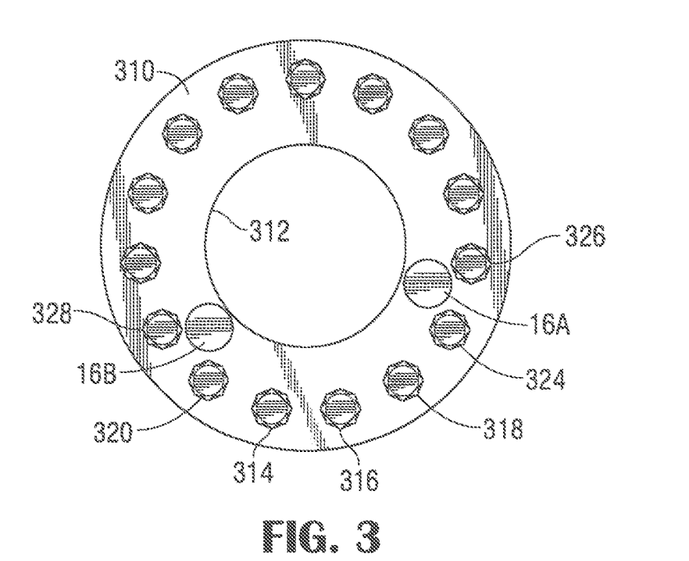
FIG. 3 depicts a top view of a pipe flange showing possible locations for extension insertion for use with a subsea flange tool in accord with one possible embodiment of the present invention.

Referring still to FIG. 1, a second support (14B) is located on second lower leg (18B). Opening (17B) in second support (14B) can receive the second driver alignment member (16B), which is held within the second support (14B). A similar locking arrangement is utilized whereby second driver alignment member (16B) can also be axially moved in the direction indicated by arrow (13) for adjustment of the position of an end (15B). As discussed hereinafter, the first and second driver alignment members (16A, 16B) can be used to provide axial alignment or adjustment for operation of tool (100) by being adjustable in axial length to engage (e.g., abut) a surface (434) of the flange connection (310), as depicted in FIGS. 3 and 4, when socket (28) fully engages (e.g., covers, mates) the fastener (316) for threading or unthreading.

As further depicted in FIG. 2, the first and second driver alignment members (16A, 16B shown in FIG. 1) may contain a recessed or narrower portions (21), instead of being a constant diameter along the entirety of their length, enabling the alignment members (16A, 16B) to be inserted into the openings (17A, 17B). In the depicted embodiment, first and second driver alignment members (16A, 16B) are cylindrical; however, in other embodiments, the alignment members could be square, rectangular, triangular, or the like. The narrower portion (21) may contain an external threaded surface (not shown), which can engage an internal threaded surface (not shown) of the support (14A), wherein rotation of the first alignment member (16A) can adjust the extension of the first driver alignment member (16A). Lock nuts (20A, 20B) can be used to tighten the first driver alignment member (16A) in position against the first support (14A). The second driver alignment member (16B) may comprise the same or similar configuration. As discussed below, first and second driver alignment members (16A, 16B) can also be used to stabilize and resist rotation of the subsea flange tool during threading operations; therefore, the diameter of the first and second driver alignment members (16A, 16B) can be another consideration.

Referring again to FIGS. 1 and 2, a nut driver shaft (26) comprises a socket (28) usable to mate with a plurality of fasteners, including nuts, bolts, screw, and any other fasteners and rotationally connect or disconnect the fasteners with or from a pipe flange. In one embodiment, nut driver shaft (26) and socket (28) may be of one-piece construction; however, in another embodiment (not shown), the socket (28) can be detachable from the nut driver shaft (26). In yet another embodiment (not shown), the socket (28) and driver shaft (26) assembly can be removable from a nut drive fixture (22). The head of the socket (28) is octagonal in this embodiment, but in other embodiments (not shown), the head of the socket (28) may comprise a hexagonal shape, a pentagonal shape, a square shape, or any other shape operable to mate with subsea pipeline fasteners. Accordingly, nut driver shaft (26) and socket (28) may be of various lengths and sizes, as desired. Specifically, the socket (28) may be interchangeable such that the socket (28) can comprise a socket head only, or the socket (28) can comprise a socket head and a shaft, all of which can vary in size and/or shape. In addition to the socket (28) being interchangeable, for use in holding various sizes and shapes of bolts and other fasteners, the socket (28) can be magnetic for attracting and holding bolts and other fasteners.

To support nut driver shaft (26) in a desired axial orientation, nut driver fixture (22) is provided. As shown in FIG. 1, the nut driver fixture (22) is depicted attached to a forward (e.g. lower) portion of the frame (10), adjacent to the center of curvature (12), and can be held together by fasteners (34A), (34B), (34C), (34D). Nut driver fixture (22) can be mounted at an equal distance from both of the first driver alignment member (16A) and the second driver alignment member (16B), as shown. In this embodiment, the nut driver fixture comprises upper and lower blocks (23A) and (23B). Lower block (23A) may be welded to frame (10), whereby upper block (23B) can be removed or opened by removing or loosening fasteners (34A), (34B), (34C), and (34D). Nut driver fixture (22) can provide at least radial support to nut driver shaft (26) and socket (28) for maintaining axial alignment between driver shaft axis (442) (See FIG. 2) and flange bolt axis (424), during operation of the subsea flange tool (100). Nut driver fixture (22) may also comprise bearings that support nut driver shaft (26), both axially and radially, if desired. Nut driver fixture (22) can be opened to allow replacement and/or utilization of different lengths of nut driver shaft (26) and socket (28) with subsea flange tool (100). Nut driver shaft (26) can be received into aperture (24) in nut driver fixture (22), wherein the aperture (24) can be provided through the central portion of nut driver fixture (22) and defined by upper and lower blocks (23A) and (23B).

In the embodiment depicted in FIGS. 1 and 2, the central axis (442) of the nut driver shaft (26) and nut driver socket (28) is positioned radially closer to the pipe (312) wall (See FIGS. 2 and 4) than the axis (443) of the motor (70) that drives the nut driver socket (28). This can be done in several ways. In the depicted embodiment, the axis of the motor (70) and the axis of torque converter (i.e., torque multiplier) (50) (e.g., torque booster, transmission) are in line along axis (443). However, in another example (not shown), the torque converter (50) could be designed with an offset shaft. As shown in FIG. 1, the motor comprises hydraulic connectors (72A, 72B) for receiving hydraulic fluid to pressurize and power the motor (70) and for returning the hydraulic fluid to a storage tank, reservoir, or other storage container.

FIGS. 1 and 2 further show a flexible drive (31) (e.g., a flexible shaft) utilized for transferring torque from the torque converter (50) to the nut driver shaft (26). The FIGS. depict flexible drive (31) components, namely a nut driver shaft (26) extending through nut driver fixture (22) and pivotally connecting with flexible drive end connector (32) on an opposite end of nut driver fixture (22). Middle flexible joint (30) pivotally connects with joint (33), which then connects to shaft (38) that is radially supported by upper flexible joint fixture (40).

Flexible joint fixture (40) can be attached to frame (10) by fasteners, such as (82A) and (82B). Fasteners (42A), (42B), (42C), (42D) and (45) can be utilized to secure two portions of the flexible joint fixture (40) together. A flexible drive, such as flexible drive (31), can be operable to transform rotation from one axis of rotation to another axis of rotation. In the depicted embodiment, the flexible drive (31) can deliver the torque generated from the rotation axis of motor (70) and torque converter (50), namely axis (443), to the rotation axis of nut driver fixture (22) and nut driver shaft (26), namely axis (442). In the depicted embodiment, both of these axes (442, 443) are parallel, but they need not be. While the axis of rotation of motor (70) and nut driver shaft (26) are parallel in this example, the axis of rotation of nut driver shaft (26) is radially closer to pipe (312) in order to allow the head of the socket (28) to engage the fasteners extending through the flanges (441, 436), which are relatively close to pipe (312). Flexible joint fixture (40) may comprise radial and/or axial thrust bearings therein, to support and allow the rotational motion of the shaft (38).

Flexible joint fixture (40) also supports rotation of the shaft (86), which is coupled with shaft (84) of torque converter (i.e., torque multiplier) (50), wherein shaft (84) connects to the torque converter fixture (i.e., torque multiplier fixture) (80) through a seal assembly (66). In the present embodiment, torque converter fixture (i.e., torque multiplier fixture) (80) supports one end of torque converter (50), wherein the torque converter fixture (80) is shown held in place by fasteners (53A, 53B). However, other means may be used to couple torque converter fixture (80) to flexible joint fixture (40) consistent with the teaching of the present disclosure.

Accordingly, torque converter (50) is operably connected to motor (70) to transfer the rotational motion (e.g., torque) generated by motor (70) to the flexible joint fixture (30), and finally to nut driver shaft (26). Torque converter (50) can be a transmission type geared device, which increases torque from motor (70) to provide a slower rotational speed, but increases rotational force to remove/tighten a fastener from a pipe flange. Motor (70) may preferably be hydraulic, but could be pneumatic or electric depending on the application.

Subsea flange tool (100) can be operated by divers and/or a remotely operated vehicle (ROV). The present invention can provide more than one type of rail for connection to a remotely operated vessel (ROV) or for manual operation by a diver. In the embodiment of the flange tool (100) depicted in FIGS. 1 and 2, the rail (57) extends radially outwards from frame (10), on the opposite side from pipe guides (18) and (19) and can be orthogonal and/or perpendicular to frame (10). As shown in FIG. 1, first leg portion (55A) is attached to a first rail fixture (60A) and second leg portion (55B) is attached to a second rail fixture (60B), with a middle rail (56) connecting first leg portion (55A) and second leg portion (55B). Rail fixtures (60A), (60B) can be fixed to frame (10) by fasteners (62A), (62B), (62C), (62D).

Furthermore, as depicted in FIGS. 1 and 2, the radial distance that rail (57) extends from a flange or pipe can be adjustable. In the depicted embodiment, the leg portions (55A), (55B) can be adjustably mounted. For example, pin (63) can be used with corresponding openings in the leg portions (55A, 55B) to lock the rail (57) in position after the rail was extended further from, or moved closer to, the frame (10), as desired. In other embodiments, bend portions (54A, 54B) may be removed from the configuration. However, it will be understood that other connectors can be utilized to adjust the radial position of rail (57) with respect to frame (10).

As depicted in FIG. 1, other fixtures for operating the flange tool (100) can be provided. The Figure depicts T-shaped rail (58) mounted to the perpendicular middle rail (56) and extending generally parallel to the frame body (10), to provide additional leverage and control of the flange tool (100) by the diver or the ROV. Accordingly, rail (57) and T-shape rail (58) provide multiple access points for an ROV or to divers to maneuver subsea flange tool (100) into position. If desired, the length of T-shaped rail (58) can be provided with different lengths of, and/or angles with respect to, the frame (10). Generally, the ROV will position subsea flange tool (100) above or adjacent to the flange and, then, move subsea flange tool (100) axially as indicate by arrow (71) in FIG. 1, to align the nut driver shaft (26) with the fastener (316, see FIG. 4).

Reviewing the above discussed components from the perspective of FIG. 2, there is shown side elevational view of subsea flange tool 100 in accord with one possible embodiment of the present invention. The nut driver shaft (26) of the subsea flange tool (100) can engage fasteners used to connect the pipe flange (310), wherein the fasteners engage the flanges (436, 441) while in parallel with the pipe (312). As discussed above, frame (10) consists of an elongated body with upper legs (19A, 19B) and lower legs (18A, 18B) designed to wrap around and engage the outer curved portion of a pipe segment (312) being worked on.

As discussed above, rail (57) extends outward perpendicular to frame (10). Rail (57) and T-shape rail (58) provide flexibility for an ROV or a diver to maneuver subsea flange tool (100) into position with respect to a pipe flange and a fastener. Second leg portion (55B) attaches to rail fixture (60B), with rail fixture (60B) secured to frame (10) by fasteners (62A, 62B). The T-shaped rail (58) can be parallel or angled outwardly to frame body (10). In another embodiment, extendable bent portion (54B) can be smaller in diameter than second leg portion (55B) and can fit within second leg portion (55B) to be extended further out from frame (10) if a larger clearance is needed for rail (57). In other embodiments, rail (57) may not comprise T-shape rail (58), or T-shaped rail (58) may be utilized without rail (57).

Referring again to FIG. 2, the torque multiplier (50) connects with motor (70) to generate the required torque to remove a fastener from a pipe flange. Torque multiplier fixture (80) is attached to frame (10) by fastener (53B) to keep the torque multiplier (50) stationary during operation. In the present embodiment, output shaft (84) is operatively connected with the flexible joint shaft (86) by a coupling (52), which may comprise a variety of mechanisms to allow torque multiplier (50) to interact with flexible joint (30), consistent with the present disclosure. Flexible joint fixture (40) is attached to frame (10) by multiple fasteners and provides a stabilizing force as the torque is transferred from motor (70) to nut driver shaft (26). Flexible joint fixture bolts (82A, 82B) can be used to secure frame (10) to flexible joint fixture (40) from one side and flexible joint fasteners (42C, 42D) can be used to secure flexible joint fixture (40) to frame (10) from an opposite side with respect to frame (10).

Flexible joint (31) attaches shaft (38) to nut driver shaft (26) and transmits the force generated from motor (70) and torque converter (50) to nut driver shaft (26). Flexible joint (31) operates to deliver the drive force generated from the larger axis of motor (70) and torque converter (50) to the smaller axis of nut driver fixture (22) and nut driver shaft (26). Flexible joint fixture (40) can be attached to frame (10) by fasteners (42C, 42D). In the present embodiment, nut driver connector (32) operates as a mating receptacle for nut driver shaft (26). In another embodiment, flexible joint (31) may comprise a connection to attach with nut driver shaft (26) directly. In yet another embodiment, nut driver fixture (22) may provide a rotating connection for nut driver shaft (26) on one end and be coupled to flexible joint (31) directly on an opposite side from nut driver shaft (26). As shown, first driver alignment member (16A) can be parallel and offset with respect to nut driver shaft (26).

FIG. 3 depicts a top view of flange connection (310) for use with subsea flange tool (100) in accord with one possible embodiment of the present invention. Flange fastener (316) is a representative bolt, nut, or the like desired to be fastened and/or removed from the pipe flange connection (310). On one side of flange fastener (316) are flange fasteners (314, 320, 328) and on an opposite side are flange fasteners (318, 324, 326). The spacing between each of the bolt heads is normally equal with respect to each other and with respect to radius (452, shown in FIG. 4) between each fastener axis, such as axis (424) and pipe axis (450), which are both shown in FIG. 4. Typically, pipe flange connection (310) contains an upper and lower flange (436, 441) with multiple fasteners spaced evenly in a circular configuration through the pipe flanges (436, 441), which are shown in FIG. 4.

In one embodiment of the invention, first and second driver alignment members (16A, 16B) can be utilized to provide alignment and stability functions when inserted in the spacing between the flange fasteners, as indicated in FIG. 3. Assuming sufficient space, alignment members (16A) and (16B) can contact with upper surface (434) (see FIG. 4) of upper flange (436). When properly positioned, and depending on the spacing, first driver alignment member (16A) will be wedged between flange fasteners such as, for example, only fasteners (324, 326) and outer pipe wall (312), while second driver alignment member (16B) will be disposed between fasteners (320, 328), and outer pipe wall (312). The positioning of first driver alignment member (16A) and second driver alignment member (16B) will prevent rotational movement of subsea flange tool (100) while nut driver shaft (26), as depicted in FIG. 1, engages flange fastener (e.g., flange bolt head) (316). The diameter and/or cross-sectional shape of first and second driver alignment members (16A, 16B) can be selected in accord with the radial spacing between the flange fasteners and the outer wall of pipe (312).

Turning now to FIG. 4, showing a side view of the subsea flange tool (100) engaged with pipe flange connection (310). Pipe flange connection (310) comprises upper flange (436) and a lower flange (441), which can be held together with multiple fasteners, such as bolt, nuts, studs or the like, such as flange fastener (e.g., flange bolt) (316). In this non-limiting example, subsea flange tool (100) is utilized to tighten/loosen flange fastener (316). Flange fastener (316) may comprise a threaded stem or shaft or stud (e.g., flange bolt) (428) that extends into receptacle (430), which may or may not be threaded and/or comprise a nut or the like, which may or may not be welded to lower flange (441). Nut driver shaft (26) can be aligned with flange fastener (316) and positioned and moved vertically or parallel to pipe (312), as indicated by arrow (440). Arrow (440) is parallel to arrows (13) and (71) discussed hereinbefore, which are parallel or substantially parallel to axis (424) of flange bolt (428) and wall of pipe (312). Socket (28) can be moved along axis (442, 424) with respect to flange fastener (316), whereby a portion of socket (28) engages with flange fastener (316).

In one possible embodiment, first driver alignment member (16A) can engage surface (434) of the upper flange (436) when the portion of the socket (28) of nut driver shaft (26) fully engages flange fastener (316). First driver alignment member (16A) will be positioned between the wall of the pipe (312) and another flange fastener (e.g., bolt head), as discussed in FIG. 3, to counter the torque produced by subsea flange tool (100) and prevent rotational movement of subsea flange tool (100) during operation.

Figure 5:
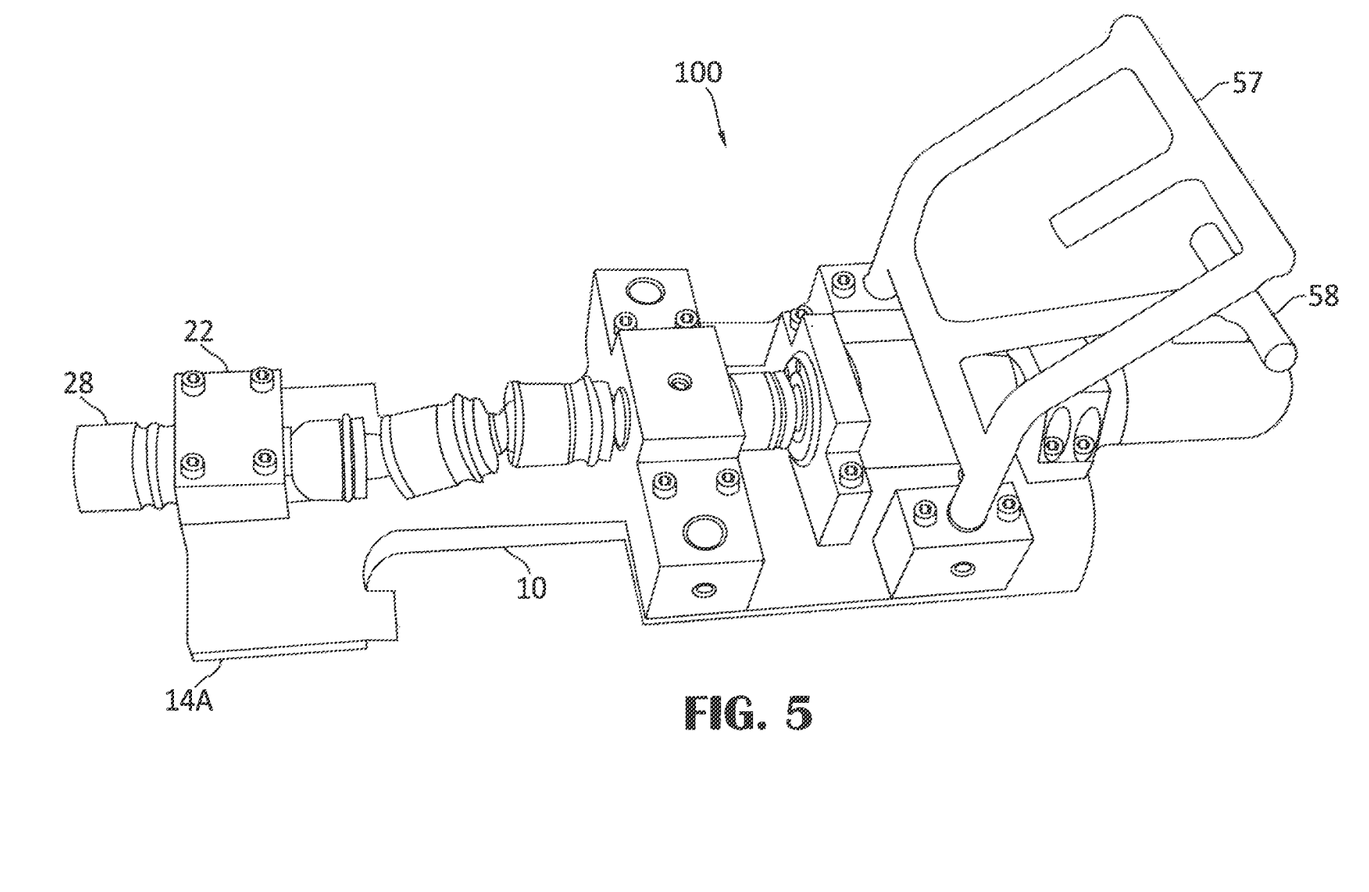
FIGS. 5 and 6 depict a subsea flange tool in accord with embodiments of the present invention.
Figure 6:
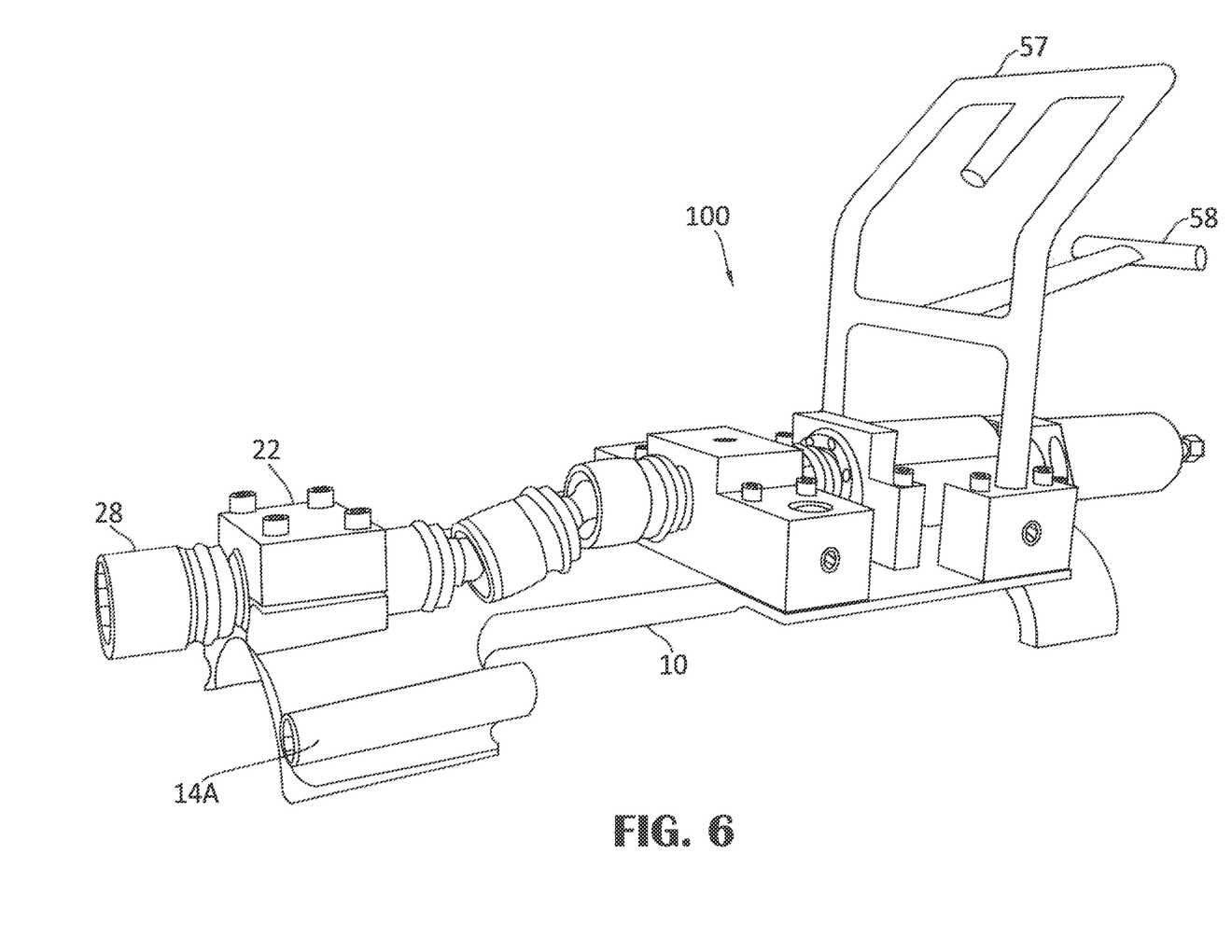

FIG. 5 and FIG. 6 depict a subsea flange tool (100) in accord with embodiments of the present invention. FIGS. 5-6 depict an embodiment of the subsea flange tool (100) with a frame (10) having empty support members (14A, 14B not visible) lacking the driver alignment members (16A, 16B, shown in FIGS. 1-2) and where the socket head (28) is directly connected to the nut driver fixture (22), lacking the shaft (26, shown in FIGS. 1-2), illustrating how these components may be removed in order for the subsea flange tool (100) to fit into more restrictive spaces and reach otherwise inaccessible bolts or other flange fastening mechanisms. (While this embodiment includes rail (57) and T-shaped rail (58), these components may also be selectively omitted as discussed above.)

Figure 7:
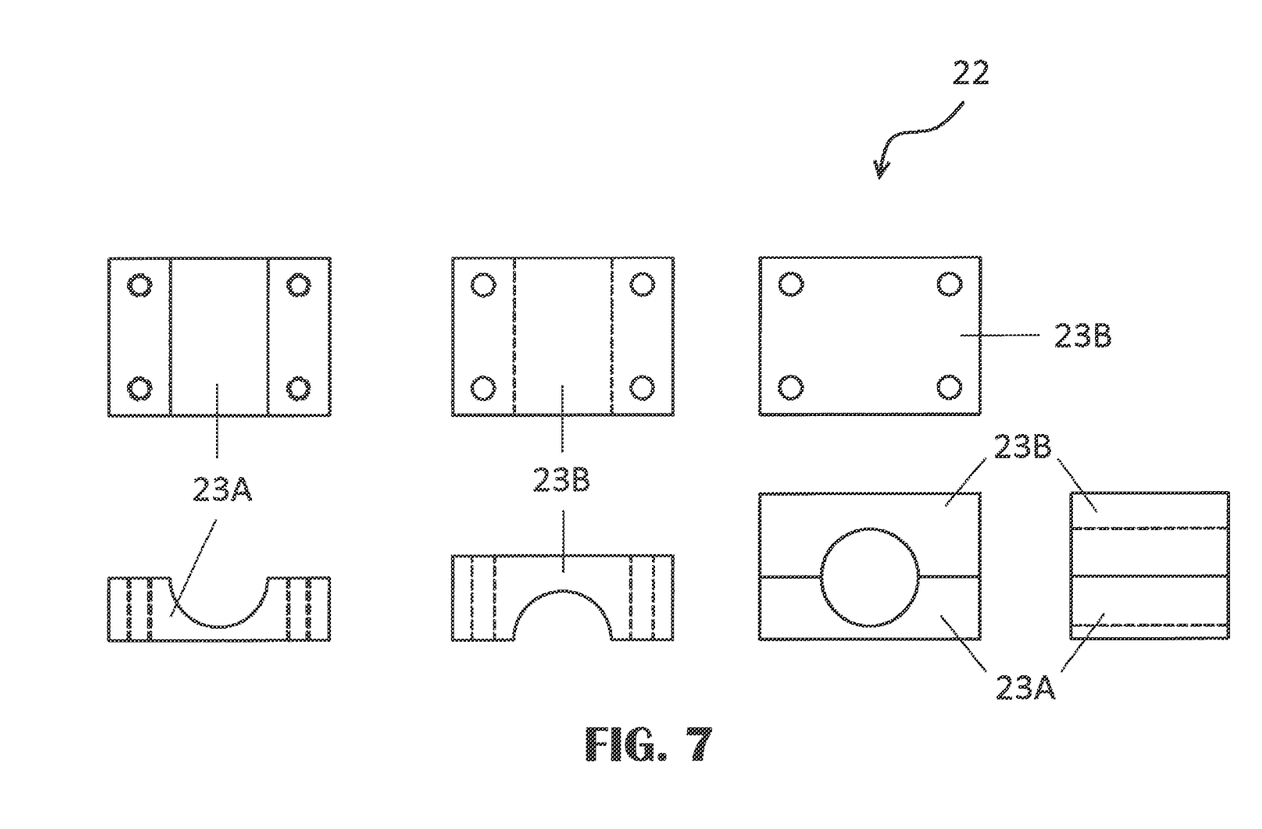
FIG. 7 depicts an embodiment of a nut driver fixture, usable with the present invention, with views of an upper block and a lower block of the nut driver fixture.
Figure 8:
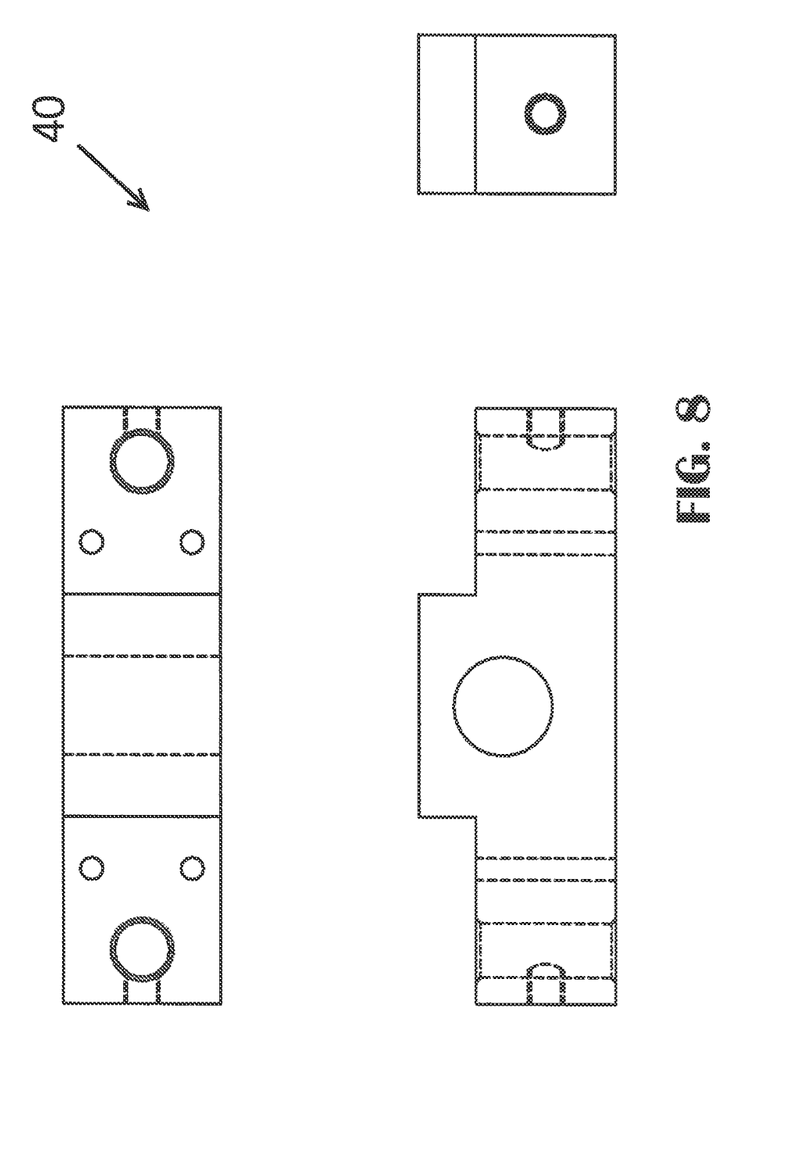
FIG. 8 depicts views of an embodiment of a flexible joint fixture usable with the present invention.
Figure 9:
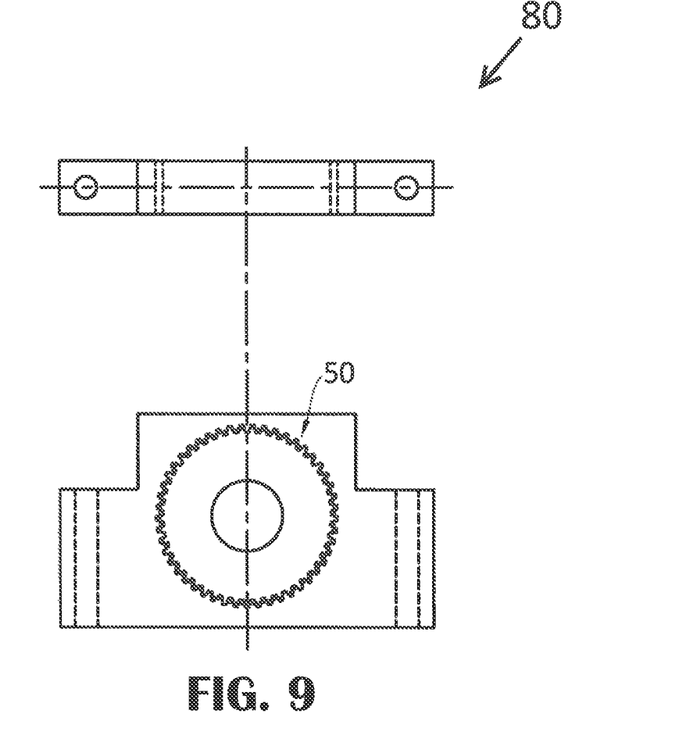
FIG. 9 depicts an embodiment of a torque converter (torque multiplier) fixture usable with the present invention.
Figure 10:
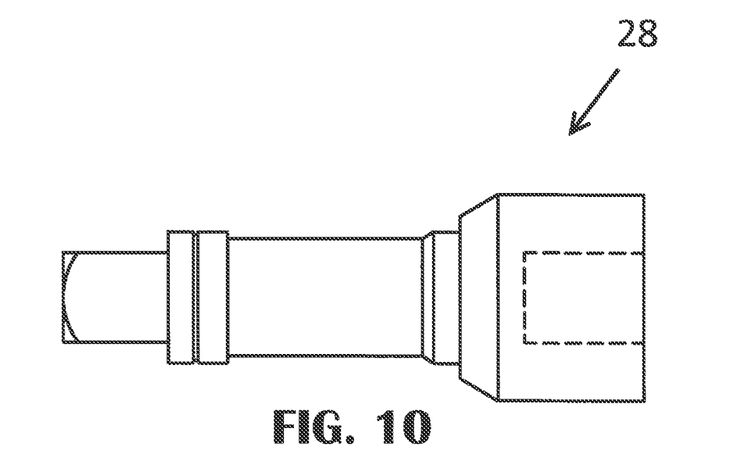
FIG. 10 depicts an embodiment of a socket usable with the present invention.

With regard to FIGS. 7-10, the figures depict member components of an embodiment of a subsea flange tool of the present invention. Specifically, FIG. 7 depicts an embodiment of a nut driver fixture (22) that comprises an upper block (23B) and a lower block (23A). However, other configurations of the nut driver fixture (22) are usable with the present invention. The nut driver fixture (22) can provide at least radial support to the nut driver shaft (26) and the socket (28) for maintaining axial alignment between the driver shaft axis (442) (See FIG. 2) and flange bolt axis (424), during operation of the subsea flange tool (100). An embodiment of the socket (28) is shown in FIG. 10.

FIG. 8 depicts a plan view, side on view, and front view of an embodiment of a flexible joint fixture (40) usable with the present invention. The flexible joint fixture (40) of the subsea flange tool (100), as shown in FIGS. 1-2, is connected to the flexible drive (31) operable to transform rotation from one axis of rotation to another axis of rotation and, thus, deliver the torque generated from the rotation axis of motor (70) and torque converter (50), namely axis (443), to the rotation axis of the nut driver fixture (22) and nut driver shaft (26), namely axis (442). An embodiment of a torque converter (torque multiplier) fixture (80), which comprises the torque converter (50), is shown in FIG. 9.

Figure 11:
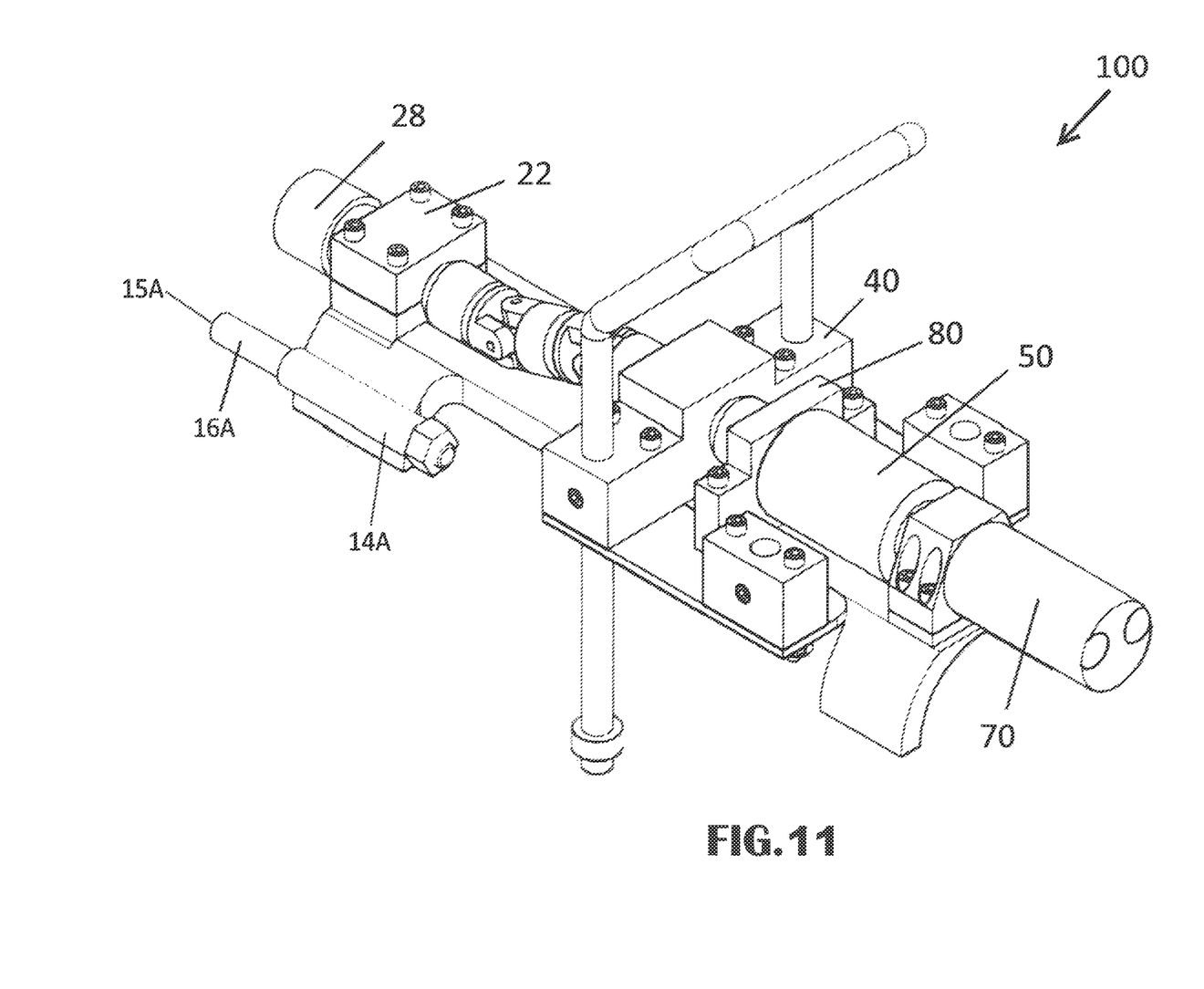
FIG. 11 depicts a subsea flange tool having adjustable driver alignment members for alignment of the subsea flange tool with a pipe, which is in accord with embodiments of the present invention.
Figure 12:
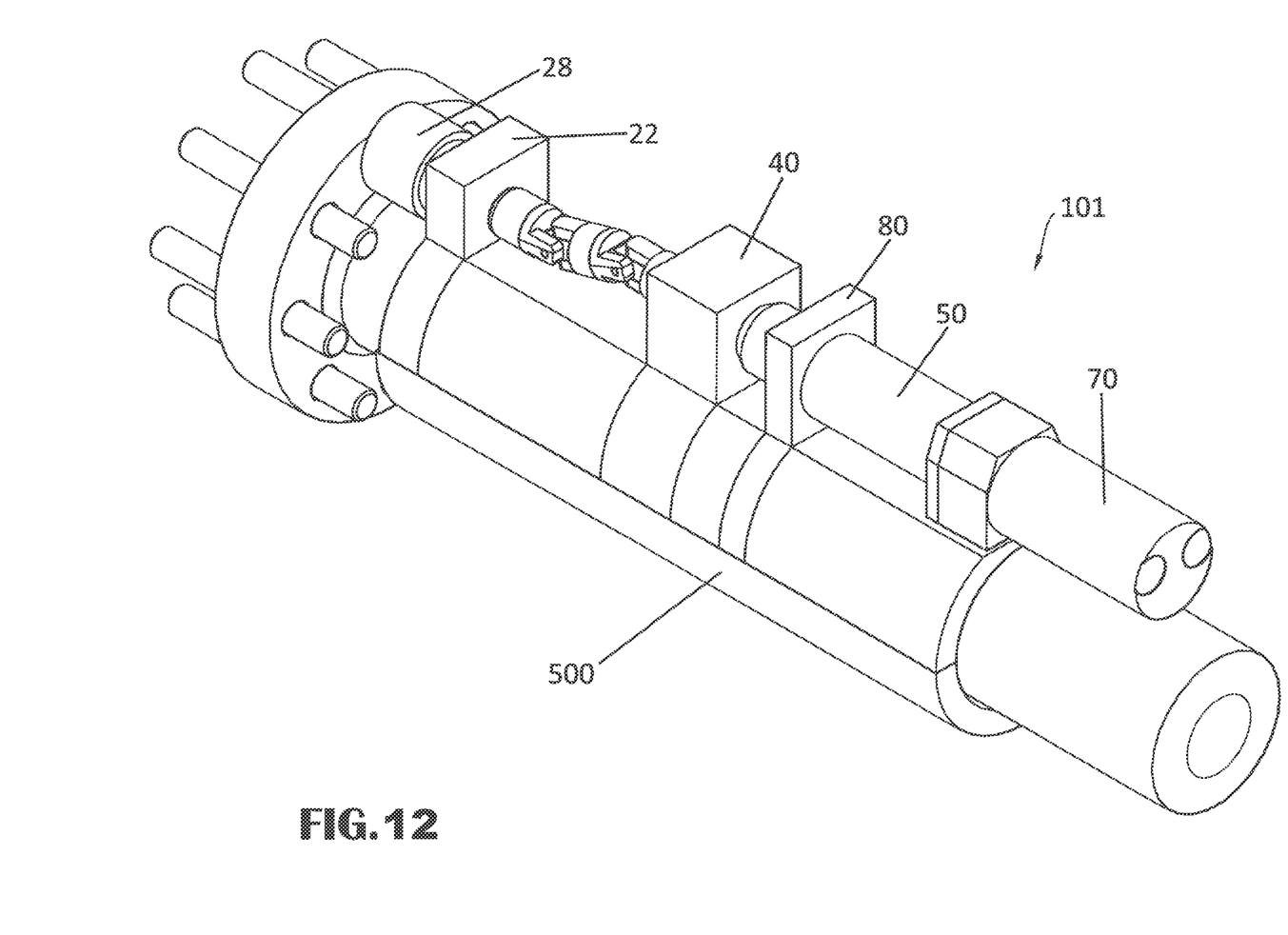
FIG. 12 depicts an alternative embodiment of a subsea flange tool, comprising a hinged guide for guiding and aligning a pipe with the subsea flange tool, which is in accord with embodiments of the present invention.

FIG. 11 depicts an embodiment of a subsea flange tool that comprises adjustable driver alignment members for use in helping to guide and align the subsea flange tool with a pipe. An alternative embodiment of a subsea flange tool (101) is shown in FIG. 12, in which a hinged guide (500) is used for guiding and aligning a pipe with the subsea flange tool (101).

The embodiments of the present invention may comprise a method for making the subsea tool (100, 101) with steps that can include: mounting motor (70) on frame (10), providing a socket (28) configured to apply torque to the flange fasteners in response to operation of the motor, and configuring the motor and the socket so that the motor shaft axis and/or torque converter axis (443) and the driver shaft axis (442) are substantially parallel to the flange fastener axis (424) for the operation of applying torque with the subsea flange tool. In one embodiment, the torque converter shaft axis (443) and the motor shaft rotational axis are concentric. Other steps may comprise mounting a first pipe guide (18) to the frame (10) to engage a pipe, such as pipe (312), and providing that first pipe guide (18) is configured to support the frame against the pipe for movement along the pipe to guide the frame in a direction as indicated at (440), which is generally parallel to the flange fastener axis. In one non-limiting embodiment, the driver shaft axis (442) can be at least substantially co-axial with the flange fastener axis (424), and the motor axis (443) is not co-axial with the flange fastener axis (424). Other steps may comprise mounting a first remotely operated vehicle fixture (57) to the frame (10), which can extend away from the frame (10) in a first direction, and providing a second remotely operated vehicle fixture (58) that is oriented in a second direction.

As used herein "substantially" parallel may mean up to or within approximately five to fifteen degrees of being precisely parallel. It will be understood that geometrical terms such as parallel, co-axial, or the like are as used in reality and will typically be off by some amount within a few degrees, e.g. within about five degrees or somewhat more or less.

While various embodiments usable within the scope of the present disclosure have been described with emphasis, it should be understood that within the scope of the appended claims, the present invention can be practiced other than as specifically described herein. It should be understood by persons of ordinary skill in the art that an embodiment of the flange tool (100) in accordance with the present disclosure can comprise all of the improvements/features described above. However, it should also be understood that each improvement/feature described above can be incorporated into the subsea flange tool (100, 101) by itself or in combinations, without departing from the scope of the present disclosure.

What is claimed is:

1. Subsea tool for applying torque to a fastener extending through a subsea pipe flange, the subsea tool comprising:
    a frame:
    a first guide in connection with the frame, wherein the first guide guides the movement of the subsea tool along a pipe;
    a motor mounted to the frame;
    a socket adapted for mating with a first fastener;
    a shaft for transferring torque from the motor to the socket; and
    a first protruding member configured to prevent rotation of the subsea tool when the protruding member is inserted between the pipe and a second fastener extending through the pipe flange.

2. The subsea tool of claim 1, further comprising a second guide in connection with the frame and spaced from the first guide, wherein the second guide guides the movement of the subsea tool along the pipe.

3. The subsea tool of claim 1, further comprising a rail adapted for connection with a remotely operated vehicle or adapted for gripping by a person.

4. The subsea tool of claim 1, wherein said first guide comprises a rounded surface which at least partially receives the pipe therein.

5. The subsea tool of claim 1, further comprising a second protruding member for insertion between the pipe and a third fastener extending through the pipe flange.

6. The subsea tool of claim 1, wherein the first protruding member and the socket extend to a same point along a longitudinal axis of the subsea tool.

7. The subsea tool of claim 1, further comprising a flexible shaft for transferring torque from the motor to the socket, wherein an axis of rotation of the motor is offset from an axis of rotation of the socket.

8. The subsea tool of claim 1, further comprising an angled shaft for transferring torque from the motor to the socket, wherein an axis of rotation of the motor is offset from an axis of rotation of the socket.

9. The subsea tool of claim 1, further comprising an interchangeable torque multiplier in communication with the motor, the interchangeable torque multiplier capable of changing an amount of speed, torque or combinations thereof, of the subsea tool.

10. A method of applying torque to a fastener of a flange connection in a subsea environment, the method comprising the steps of:
    providing a torqueing tool comprising:
        a first guide surface;
        a socket; and
        a first protruding member adjacent to the socket,
    positioning the first guide surface of the torqueing tool along a surface of a pipe;
    moving the torqueing tool along the surface of the pipe;
    mating the socket with a first fastener of the flange connection;
    inserting the first protruding member between a second fastener and the pipe to secure the torqueing tool in position and prevent rotation thereof; and
    actuating a motor to rotate the first fastener.

11. The method of claim 10, further comprising the steps of:
    providing a torqueing tool further comprising a second protruding member adjacent to the socket; and
    inserting the second protruding member between a third fastener and the pipe to secure the torqueing tool in position, thereby preventing the torqueing tool from rotating due to counter torque created while applying torque to the first fastener.

12. The method of claim 10, wherein the step of actuating the motor to apply torque to the first fastener comprises:
    actuating the motor to generate torque along an axis of rotation;
    transferring torque from the motor to the socket with a flexible shaft; and
    rotating the socket along a second axis of rotation to rotate the first fastener, wherein the first axis of rotation and the second axis of rotation are spaced apart.

13. The method of claim 10, further comprising the steps of:
    providing a torqueing tool further comprising a second guide surface spaced from the first guide surface; and
    positioning the second guide surface of the torqueing tool along the surface of the pipe.

14. The method of claim 10, further comprising the steps of providing a torqueing tool further comprising a motor.

15. A torqueing tool for rotating bolts connecting a pipe flange in a subsea environment, the torqueing tool comprising:
    a first guiding surface for guiding movement of the torqueing tool along a pipe; a socket configured to engage a first bolt; a shaft for transferring torque from a motor to the socket; and
    a first protruding member adjacent the socket, wherein the first protruding member is configured such that when the first protruding member inserted between the pipe and a second bolt of the pipe flange the protruding member prevents rotation of the subsea tool, and wherein the socket and the first protruding member are even along a length of the torqueing tool.

16. The torqueing tool of claim 15, further comprising a second protruding member adjacent the socket, wherein the second protruding member is inserted between the pipe and a third bolt of the pipe flange, and wherein the socket and the second protruding member are even in length along a length of the torqueing tool.

17. The torqueing tool of claim 15, further comprising a second guiding surface for guiding the movement of the torqueing along a pipe.

18. The torqueing tool of claim 15, further comprising an angled shaft for transferring torque from the motor to the socket, wherein an axis of rotation of the motor is different from an axis of rotation of the socket.

19. The torqueing tool of claim 15, wherein the socket is interchangeable and receives bolts of varying shapes, sizes, or combinations thereof.

20. The torqueing tool of claim 15, wherein the socket is sufficiently magnetized to hold bolts of varying shapes, sizes, or combinations thereof.

\* \* \* \* \*